US012544796B1

(12) United States Patent
Davis

(10) Patent No.: US 12,544,796 B1
(45) Date of Patent: Feb. 10, 2026

(54) DEVICE TO SORT A MIXED SOLID WASTE STREAM

(71) Applicant: CP MANUFACTURING, LLC, San Diego, CA (US)

(72) Inventor: Nicholas Davis, San Diego, CA (US)

(73) Assignee: CP MANUFACTURING, LLC, San Diego, CA (US)

( * ) Notice: Subject to any disclaimer, the term of this patent is extended or adjusted under 35 U.S.C. 154(b) by 0 days.

(21) Appl. No.: 19/275,807

(22) Filed: Jul. 21, 2025

(51) Int. Cl.
*B07B 4/08* (2006.01)
*B07B 1/16* (2006.01)
*B07B 1/46* (2006.01)

(52) U.S. Cl.
CPC .................. *B07B 4/08* (2013.01); *B07B 1/16* (2013.01); *B07B 1/4609* (2013.01)

(58) Field of Classification Search
CPC ................ B07B 4/08; B07B 1/15; B07B 1/16
USPC .................................................... 209/44, 362
See application file for complete search history.

(56) References Cited

U.S. PATENT DOCUMENTS 6,460,706 B1 * 10/2002 Davis ........................ B07B 4/08 209/672
7,893,378 B2 * 2/2011 Kenny .................... B07B 13/18 209/930
9,238,254 B1 1/2016 Davis
9,849,484 B2 * 12/2017 Guenther .................. E02F 7/06
2006/0081513 A1 4/2006 Kenny
2010/0291980 A1 * 11/2010 Ricketts .................... B07B 4/08 460/26
2015/0290681 A1 10/2015 Guenther

FOREIGN PATENT DOCUMENTS

CN 221515226 8/2024
EP 1570919 9/2005

OTHER PUBLICATIONS

International Search Report for PCT/US2025/038538 dated Sep. 29, 2025 (8 pages).

* cited by examiner

*Primary Examiner* — Molly K Devine
(74) *Attorney, Agent, or Firm* — Manuel de la Cerra

(57) ABSTRACT

A system for sorting mixed solid waste includes a rotating auger disc screen, air stream generator, and optionally adjustable tilt and motor speed. Waste is conveyed across a screen bed defined by spaced discs mounted to rotatable shafts, which are configured to create both axial and transverse movement, producing diagonal flow paths. An air stream is directed across the screen to propel light or flexible materials toward a proximal edge, while heavier, bouncing, or rigid items may exit along different edges or fall through the screen. The device is tunable to separate material into multiple output fractions based on mass, shape, and flow behavior. Discs and shafts may have non-round profiles and elastomeric surfaces to increase agitation and reduce wrapping. In some embodiments, airflow and tilt angle may be dynamically adjusted. The system concentrates maintenance-risk materials such as long, sharp, or wrapping items to improve downstream equipment protection.

17 Claims, 8 Drawing Sheets

DEVICE TO SORT A MIXED SOLID WASTE STREAM

CROSS-REFERENCE TO RELATED APPLICATIONS

None

TECHNICAL FIELD

The present invention relates generally to machines for sorting mixed recyclable materials and other waste streams.

BACKGROUND

The statements in this background section are provided to aid in understanding the present disclosure and do not constitute prior art.

Disc screens are used to sort mixed material streams in a variety of industrial settings, including mining, aggregate handling, and solid waste processing. These machines typically include a series of parallel, rotating shafts equipped with discs that form a screening surface. As material moves across the screen, separation occurs both by size and by shape. Small or loose items fall between the rotating shafts, while flat or flexible items tend to remain on top of the discs and are conveyed forward. In contrast, bulky or rounded items are more likely to bounce and drop backward through the screen. When rubber or elastomeric discs are used, the screen can provide more consistent transport of flat items and more reliable rejection of rigid or rounded ones. Disc screens are often favored for their high throughput relative to cost and footprint, especially in recycling facilities.

One known drawback of conventional disc screens is that they are prone to wrapping when processing materials such as plastic film, textiles, strapping, and similar flexible waste. These materials can become entangled around the shafts or discs during operation. When wrapping accumulates, it reduces separation efficiency and may eventually lead to machine stoppage. To restore function, operators typically must stop the system and manually clear the screen, increasing downtime and labor demands. If left unaddressed, wrapping can accelerate wear and cause further mechanical issues. These limitations make standard disc screens less suitable for difficult waste streams, such as municipal solid waste (MSW), which often includes a substantial volume of wrapping-prone materials. In typical MSW streams, textiles may represent approximately 6% of the total volume, with film plastics accounting for approximately an additional 10% of the total volume.

To address wrapping, auger screens—also referred to as screw screens—have been introduced. These systems replace the individual discs with continuous spiral flights mounted to rotating shafts. Each shaft is typically cantilevered from one end, and adjacent augers are spaced to allow the screw flights to engage material across the screen. When wrapping occurs, the rotating motion of the adjacent screw flights tends to displace and eject the entangled material off the free end of the auger. This action reduces the need for manual cleaning and lowers the risk of jamming. As a result, auger screens have seen increasing adoption in recycling and waste sortation applications as a replacement for conventional disc screens in sizing operations.

However, auger screens behave differently from disc screens in how they move and separate material. Each auger shaft not only rotates but also acts as a conveyor, pushing material along its axis. As a result, material on the screen tends to move both forward and sideways at the same time, following a diagonal path across the screen surface. When the screen is tilted upward to encourage shape-based separation—such as allowing flat items to climb to the top—the lateral movement can interfere. Instead of rising along the screen, some materials may be pulled off to the side and discharged before effective separation occurs. This makes it difficult to reliably separate flexible or flat items such as plastic film or textiles. There remains a need for improved control of this lateral movement to enable better separation on inclined auger-type screens.

SUMMARY OF THE INVENTION

Provided in various example embodiments are mechanical devices that may be used for sorting mixed solid waste using adjustable disc screens. These devices may be configured to address several persistent challenges in waste screening, including entanglement of flexible materials, limited shape-based separation, and uncontrolled lateral material flow on inclined surfaces.

The disclosed devices offer improvements in throughput, reliability, and material classification. In various example embodiments, the system includes an auger disc screen formed from rotatable shafts carrying non-round elastomeric discs, a motor with adjustable rotation speed, and an air stream generator positioned to direct airflow across the screen. The screen bed may be inclined via a tilt mechanism to promote upward travel of selected materials. The use of one or more of these elements supports sorting incoming waste into multiple distinct output fractions, improves resistance to jamming, and enhances separation of flat, flexible, or shape-sensitive items.

For example, provided in various example embodiments is a mixed waste sorting device for sorting mixed solid waste. The device may include an auger disc screen with a plurality of rotatable shafts and a plurality of discs mounted thereon. The plurality of discs may define a screen bed with a top edge, a bottom edge, a proximal edge, and a distal edge. A motor may be configured to rotate the plurality of rotatable shafts at a rotation speed. An air stream generator may be positioned adjacent to the distal edge of the screen bed. The air stream generator may be configured to generate an air stream across the screen bed from the distal edge to the proximal edge. The generated air stream may be of sufficient strength to increase the dwell time of a first fraction of the mixed solid waste on the screen bed, thus allowing the auger disc screen to propel the first fraction over the top edge of the screen bed.

In various example embodiments, the screen bed may form a tilt angle with a plane horizontal to the ground, and the device may further include a tilt mechanism configured to change the tilt angle. The tilt mechanism may comprise a hydraulic actuator or a linear actuator.

In various example embodiments, the air stream generator may comprise a fan, a plurality of fans, a manifold, or a plenum system. The direction of the air stream generator may be adjustable. The speed of the air stream generator may also be adjustable, such that a higher speed may increase the amount of material in the first fraction of the mixed solid waste that is propelled from the screen bed over the top edge.

In various example embodiments, the mixed solid waste may be sorted into: a second fraction that may fall through a space between discs on adjacent shafts; a third fraction that may exit from the screen bed along the bottom edge; and a fourth fraction that may exit from the screen bed along the distal edge.

When a tilt mechanism is present, in various example embodiments the tilt angle may be increased to increase the amount of material in the third fraction that exits from the screen bed along the bottom edge.

In various example embodiments, the rotation speed of the plurality of rotatable shafts may be adjustable, and a lower rotation speed may increase the amount of material in the fourth fraction that exits from the screen bed along the distal edge.

In various example embodiments, each disc in the plurality of discs may comprise, at least partially, an elastomeric material and may have a cross-sectional shape that is non-round.

The embodiments described in this summary are merely illustrative examples of various aspects that may be employed. These examples are not intended to limit the scope of the invention, which is defined solely by the claims. Various modifications, alternatives, and additional or different embodiments may be made without departing from the scope of the claims.

BRIEF DESCRIPTION OF THE DRAWINGS

The accompanying drawings, which are incorporated in and constitute part of this specification, illustrate example embodiments and together with the description, explain various principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the system and method described herein.

Embodiments described herein are exemplary and not restrictive. Embodiments will now be described, by way of examples, with reference to the accompanying drawings, in which:

FIG. 8C illustrates a portion of a clamshell disc that may be mounted to a shaft of an auger disc screen.

DETAILED DESCRIPTION

Figure 1:
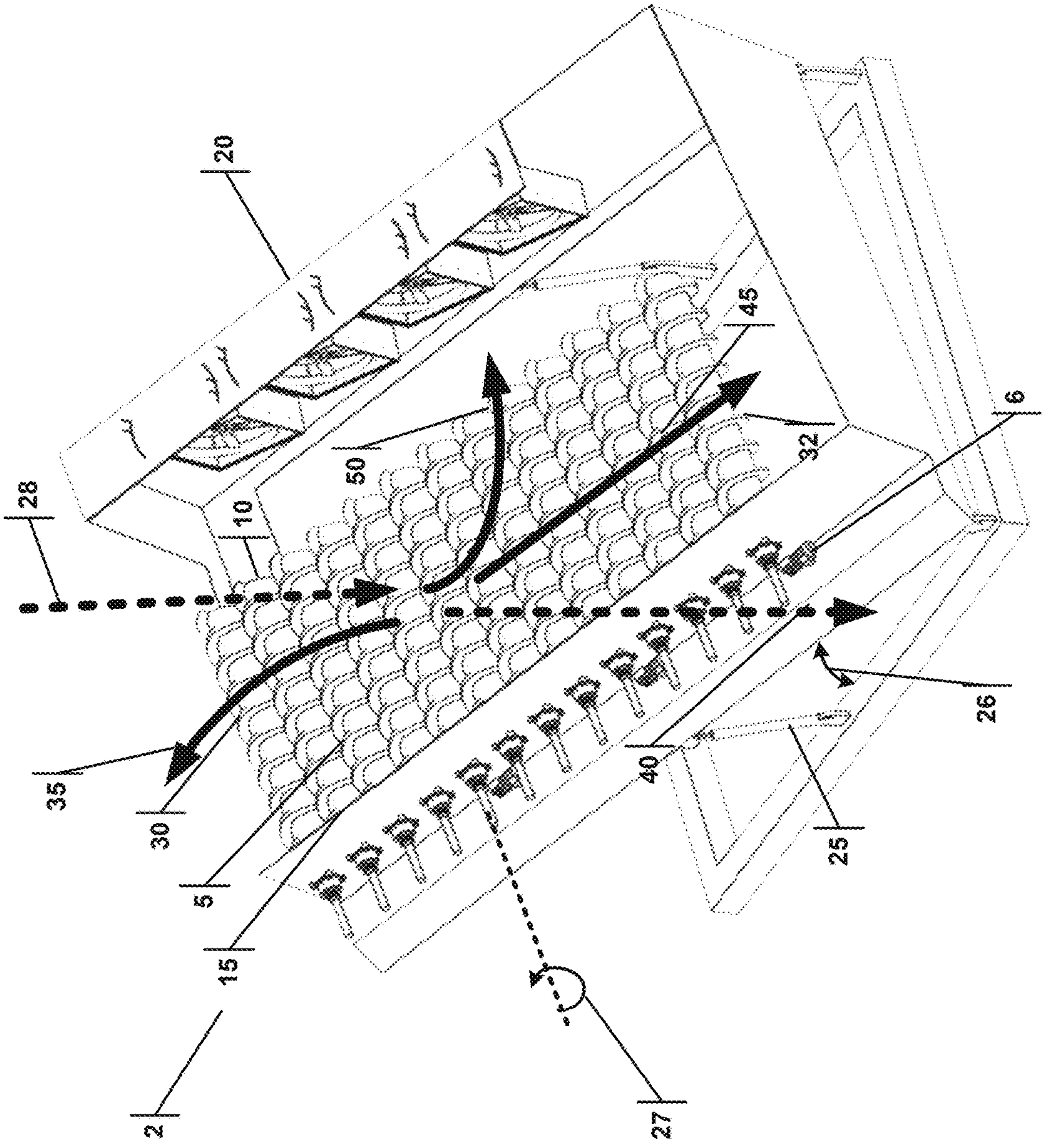
FIG. 1 is an isometric view of a mixed waste sorting device at a first tilt angle.
Figure 2:
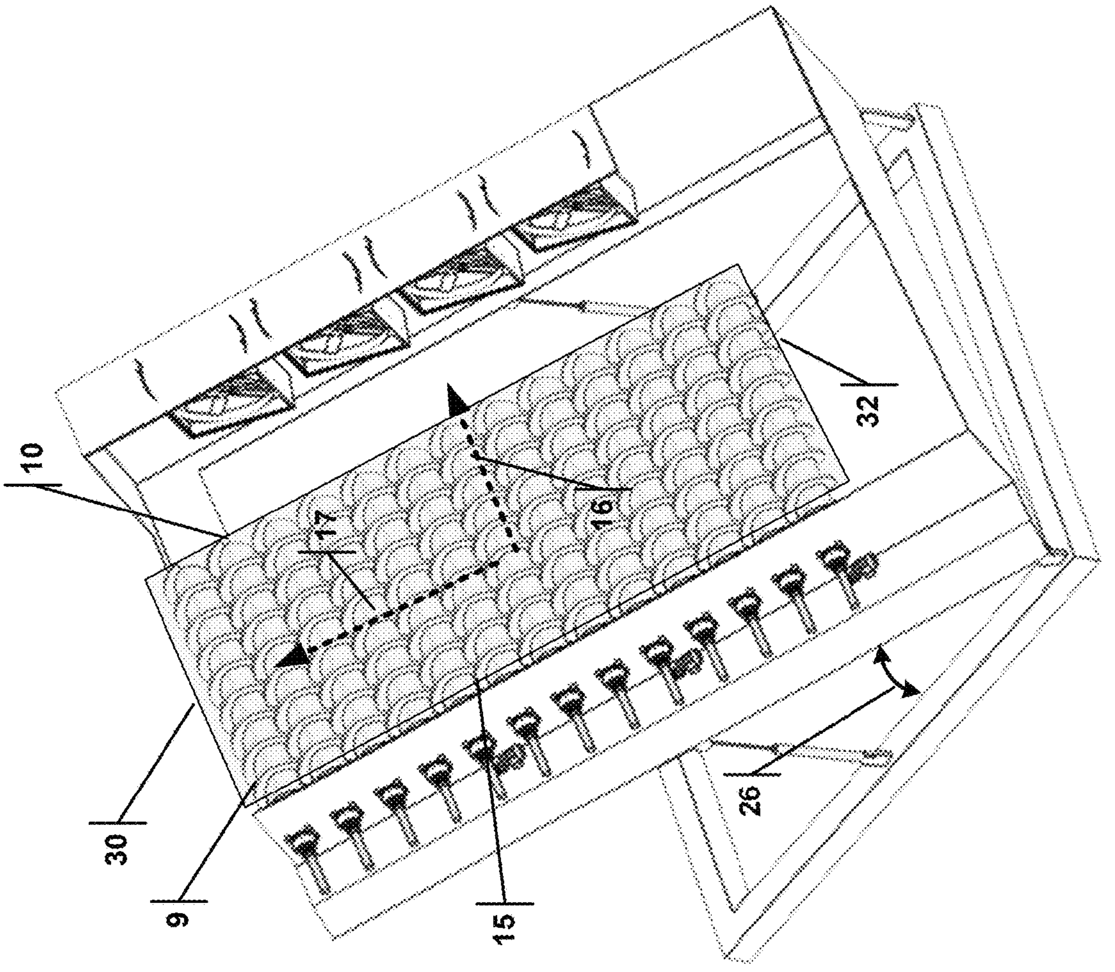
FIG. 2 is an isometric view of the mixed waste sorting device of FIG. 1 at a second, steeper tilt angle.
Figure 3:
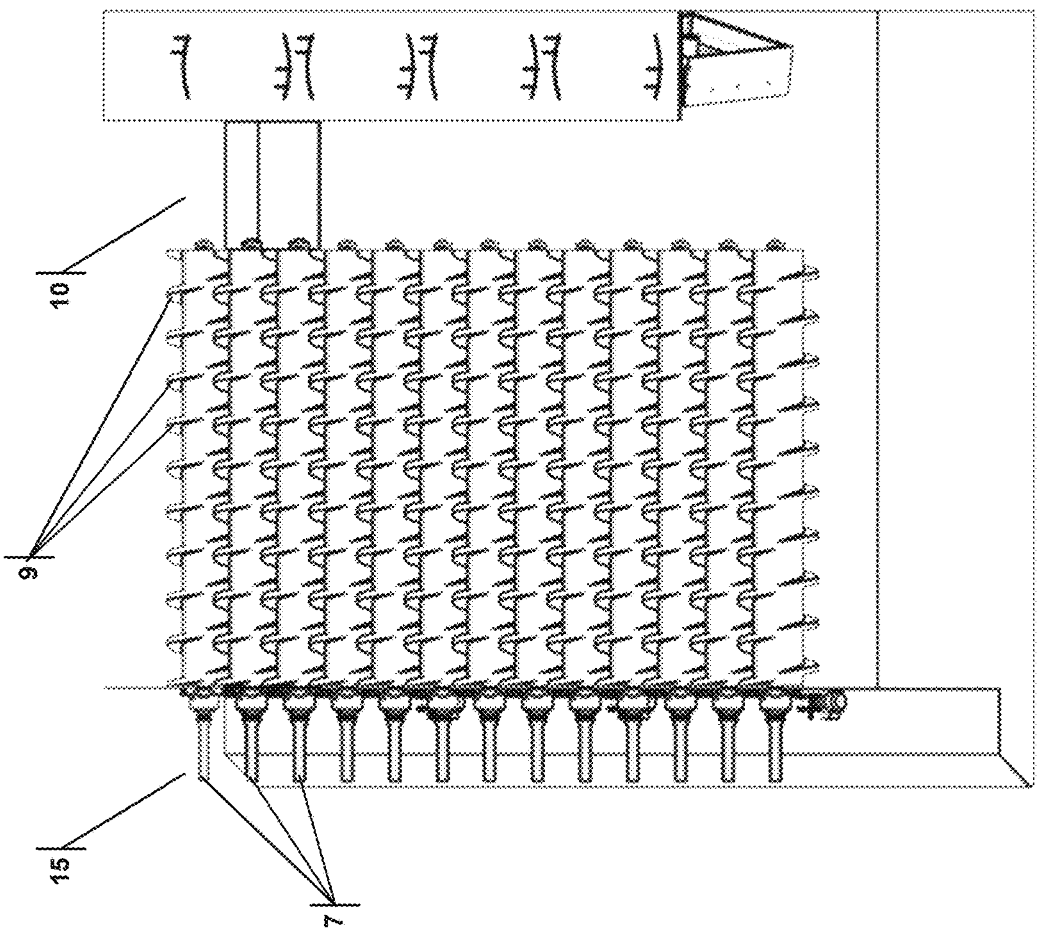
FIG. 3 is a top view of the mixed waste sorting device of FIG. 1 at the tilt angle of FIG. 2.

Reference is made herein to specific example embodiments, some of which are illustrated in the accompanying figures. While the subject matter is described in conjunction with these example embodiments, it is not intended to limit the scope of the claims to the configurations or implementations shown and described. To the contrary, it is intended that various alternatives, modifications, and equivalents be encompassed within the scope of the claims as would be apparent to persons of skill in the art.

In the following description, numerous specific details are set forth to provide a thorough understanding of certain example embodiments. However, implementations may be carried out without some or all these specific details. In other instances, process operations known to persons of ordinary skill in the art have not been described in detail so as not to obscure relevant aspects of the disclosed subject matter. Various components, operations, or relationships may be described in the singular for clarity, although multiple instances or variations may be employed in certain embodiments. Similarly, method steps are not necessarily presented in a required order, and some steps may be omitted or rearranged depending on the implementation. Furthermore, descriptions of connections or communications between entities should not be interpreted as requiring a direct or uninterrupted link, unless expressly stated; intermediate components or indirect relationships may be present in many embodiments.

The following list of example features corresponds with the attached figures and is provided for ease of reference, where like reference numerals designate corresponding features throughout the specification and figures:

Mixed Waste Sorting Device—2
Auger Disc Screen—5
Motor—6
Rotatable Shafts—7
Discs—8
Screen Bed—9
Distal Edge of Screen Bed—10
Proximal Edge of Screen Bed—15
First Lateral Force—16
Second Lateral Force—17
Air Stream Generator—20
Tilt Mechanism—25
Tilt Angle—26
Rotation of Discs—27
Top Edge—30
Bottom Edge—32
First Fraction—35
Second Fraction—40
Third Fraction—45
Fourth Fraction—50
Non-Round Disc Cross-Section—55
Typical Mixed Waste Travel Direction—52
Modified Mixed Waste Travel Direction—54
Elastomeric Material on Outer Edge of Disc Surface—60

Referring to FIGS. 1 through 8D, a mixed waste sorting device 2 is provided for separating mixed solid waste into multiple output fractions. The device 2 includes an auger disc screen 5 comprising a plurality of rotatable shafts 7, each supporting a series of spaced discs 8. The discs 8 define a screen bed 9 configured to convey, agitate, and separate material based on a combination of size, shape, mass, and flexibility. The screen bed 9 is bounded by a top edge 30, a bottom edge 32, a proximal edge 15, and a distal edge 10.

Each shaft 7 may be coupled to a motor 6 to provide adjustable rotational speed. This coupling may be, as non-limiting examples, via chains, belts or gears. As shafts 7 rotate, flat or flexible items may adhere to the rotating discs 8 and ride toward the top edge 30, while heavier or more rigid items may bounce or roll back. Small items may fall through the gaps between adjacent discs 8. The rotation of the shafts causes a first lateral force 16 towards the distal edge 10 and a second lateral force 17 towards the top edge 30. This dual-motion behavior may depend on material properties and geometry, including how individual items engage with the disc edges.

The screen bed 9 may be mounted at an adjustable tilt angle 26 relative to a plane horizontal to the ground. A tilt mechanism 25, such as a hydraulic or linear actuator, may be used to dynamically adjust the inclination. Increasing the tilt angle may promote the upward travel of shape-sensitive items and further enhance separation by mass and geometry. Tilting the screen may also extend the dwell time of certain items, improving their likelihood of reaching a desired output edge.

Positioned near or at the distal edge 10 is an air stream generator 20 configured to direct airflow across the screen bed 9 toward the proximal edge 15. The air stream generator 20 may comprise one or more fans (e.g., axial or centrifugal), a manifold, or a plenum system (such as an air knife). In some configurations, the air stream generator may be mounted on an adjustable frame or track, with zonal control that allows independent regulation of airflow direction and speed. The generator may also be positioned a distance above or offset from the distal edge 10 to allow airflow to oppose the dominant axial material motion, thereby extending dwell time and improving classification accuracy.

In some implementations, airflow may be used to counteract at least a portion of the first lateral force 16, deflecting items back toward the center of the screen. Higher fan speeds may increase the fraction of material that is propelled toward the proximal edge 15. Conversely, reduced airflow may allow heavier or low-profile items to continue toward the distal or side edges. This cross-screen airflow allows for tuning of separation thresholds based on waste composition.

The screen may separate the waste stream into at least four distinct output fractions. The waste stream is deposited in the middle of the screen bed 9, as shown by arrow 28. A first fraction 35 may include flat, flexible items (e.g., film plastic, textiles) that are pushed by the airflow towards the proximal edge 15 and pushed towards the distal edge 10 by the first lateral force 16. By balancing these two forces, the first fraction can dwell on the auger disc screen bed 9 for a longer period. The rotation of the discs within the auger disc screen 5 is shown by arrow 27, which causes the second lateral force 17, propelling the first fraction 35 up the screen bed 9 over the top edge 30.

A second fraction 40 may consist of small debris and fine organics that fall through the screen bed 9. A third fraction 45 may include bouncy items such as used beverage containers, which rebound across the screen surface and exit via the bottom edge 32. A fourth fraction 50 may comprise dense, rigid, or wrapping materials that travel to the distal edge 10 and drop off the screen. Adjusting the tilt angle 26, shaft rotation speed, or air stream characteristics may control the distribution among these fractions.

Figure 4:
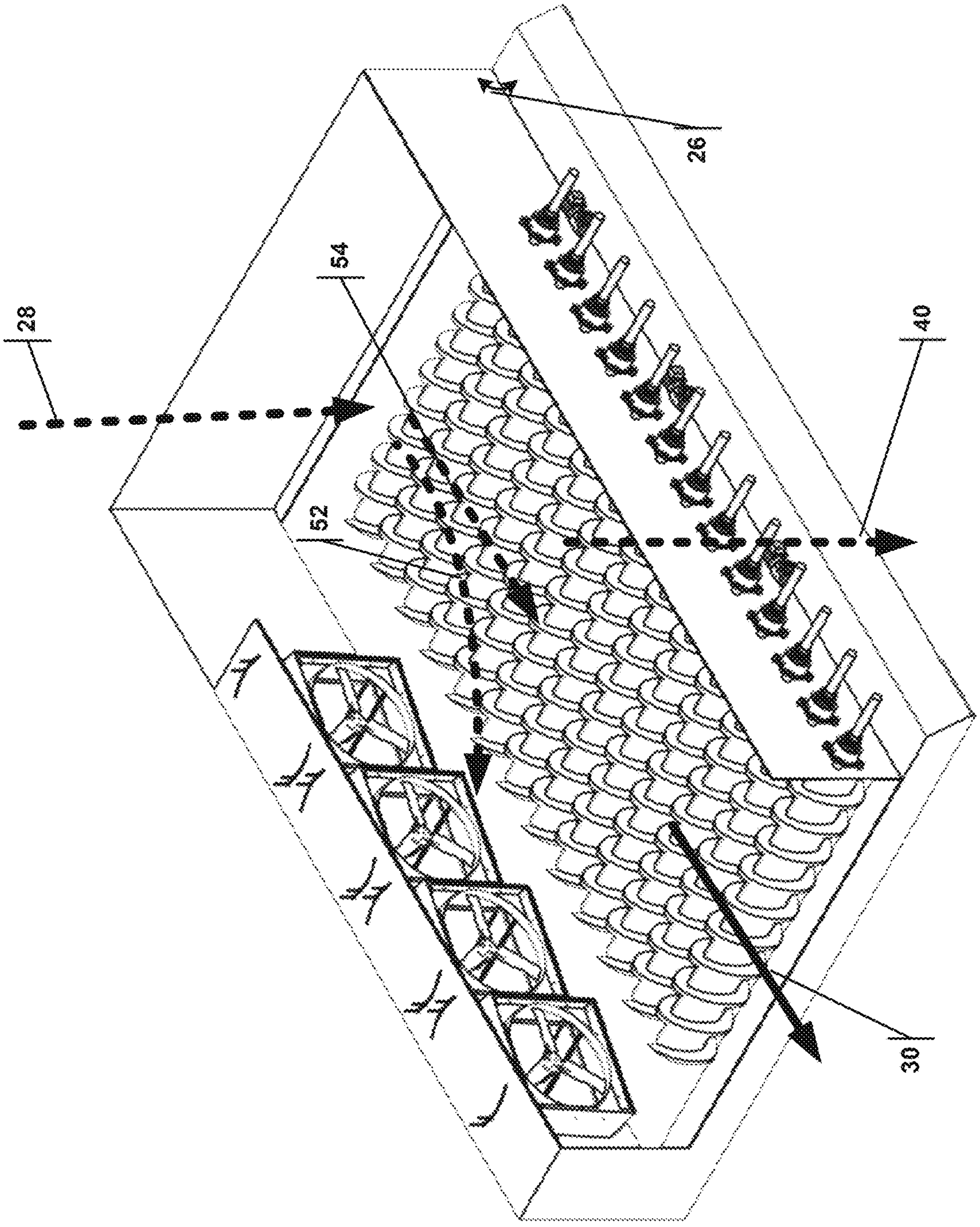
FIG. 4 is an isometric view of the mixed waste sorting device of FIG. 1 at a zero-tilt angle.
Figure 5:
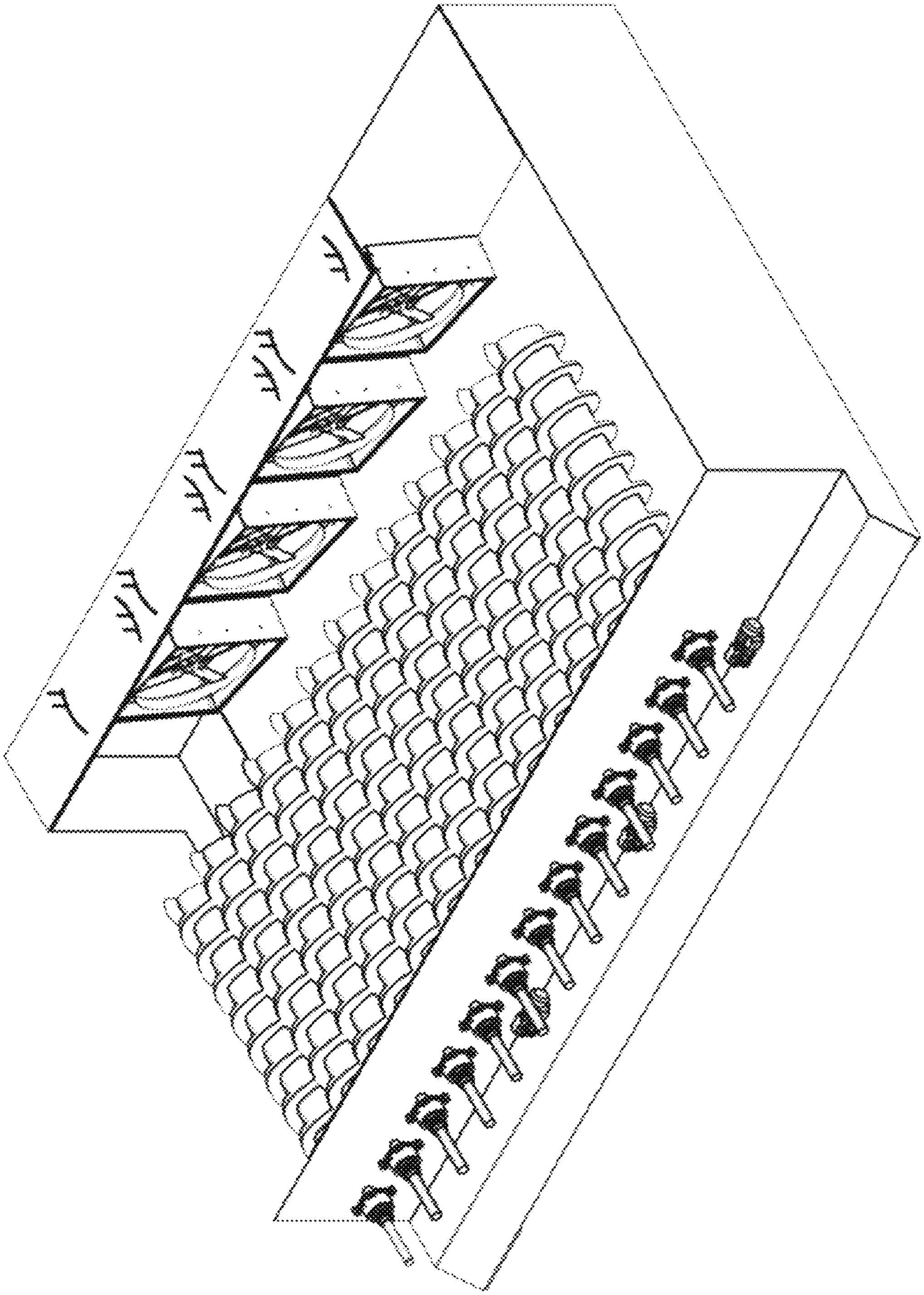
FIG. 5 is an isometric view of the mixed waste sorting device of FIG. 1 at a zero-tilt angle, from an opposite side relative to FIG. 4.
Figure 6:
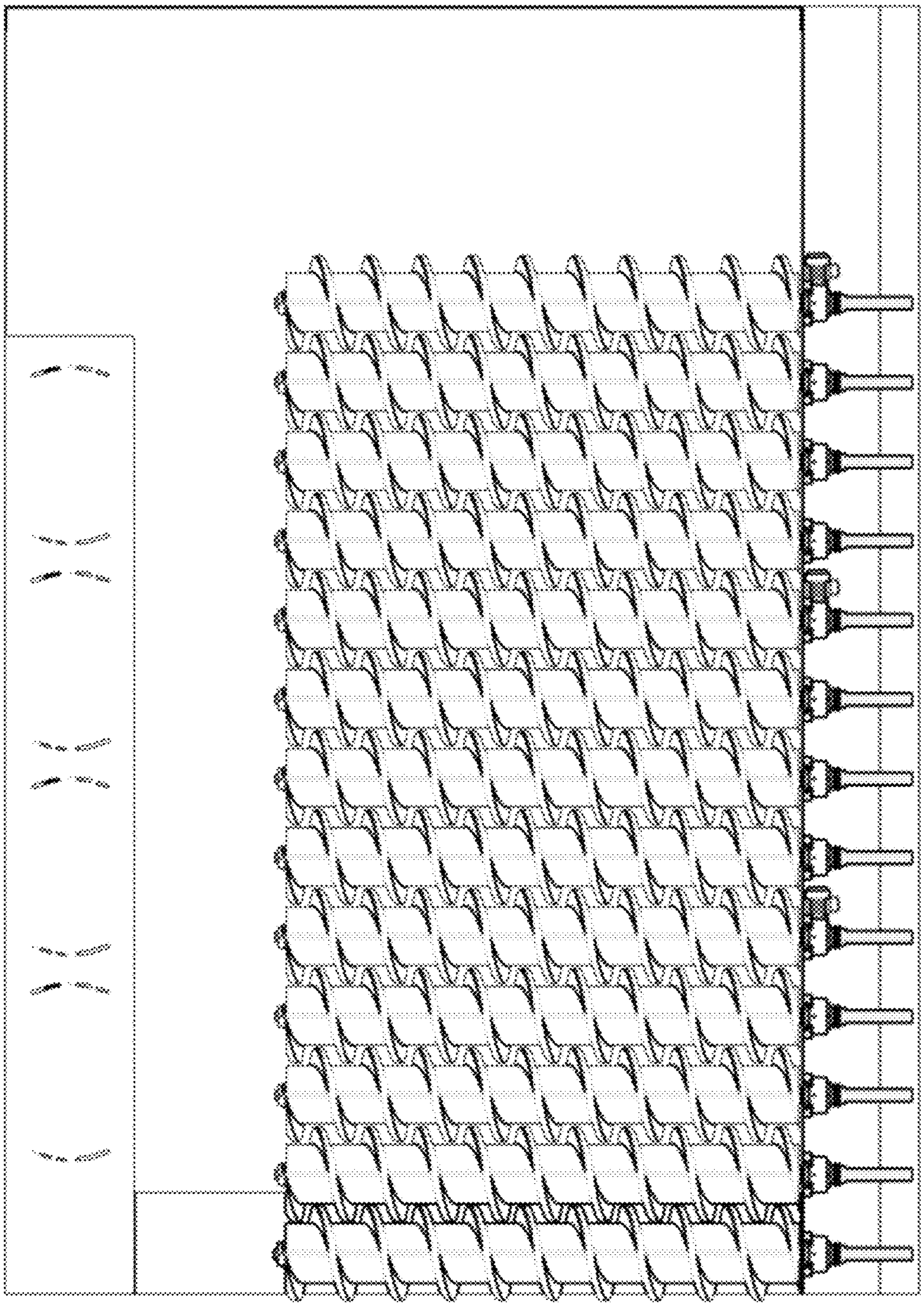
FIG. 6 is a top view of the mixed waste sorting device of FIG. 1 at a zero-tilt angle.
Figure 7:
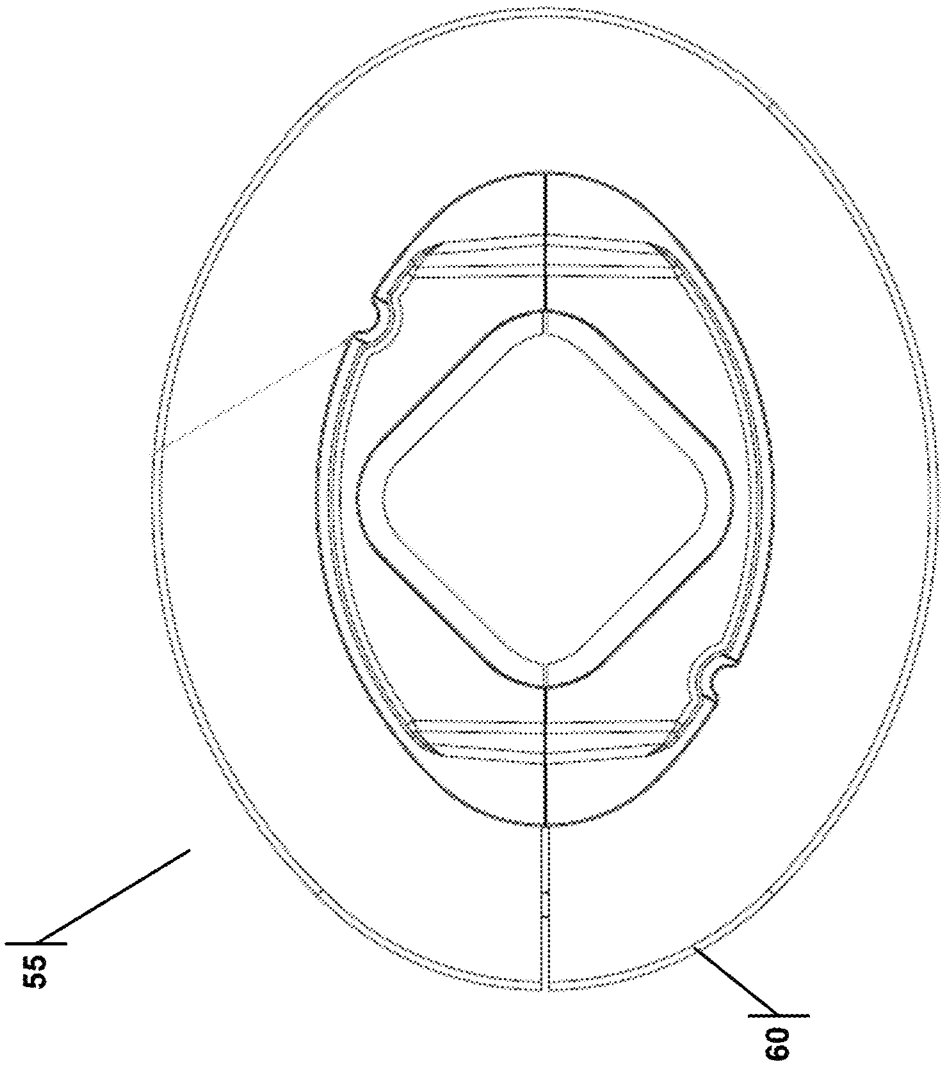
FIG. 7 is a side view of a disc that may be used in the disc screen, the disc having a non-round cross section and including elastomeric material on an outer edge of a disc surface.
Figure 8A:
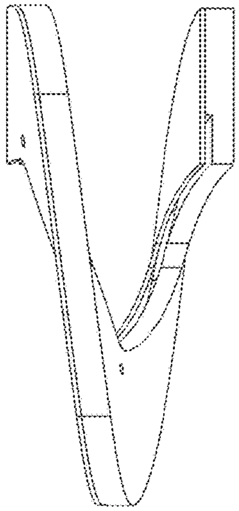
FIG. 8A illustrates a disc that may be mounted to a shaft of an auger disc screen.
Figure 8B:
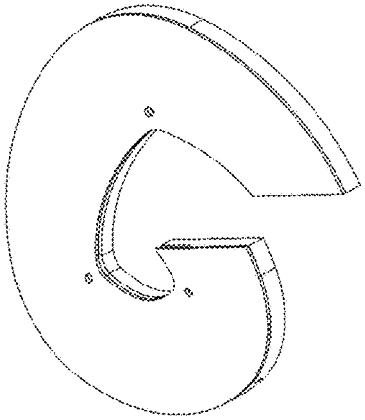
FIG. 8B illustrates a non-circular disc that may be mounted to a shaft of an auger disc screen.
Figure 8B:
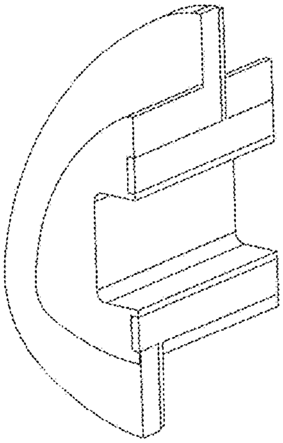
Figure 8D:
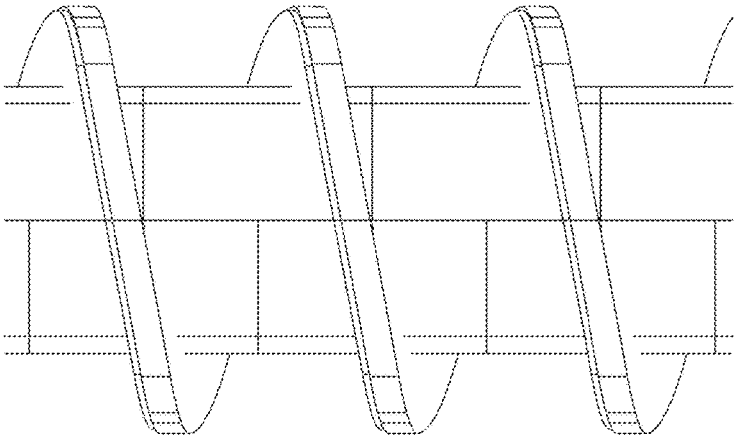
FIG. 8D illustrates several clamshell discs mounted to a shaft.

When the tilt angle 26 is less than approximately 20 degrees, preferably 0 to 10 degrees, the mixed waste stops falling back toward the bottom edge 32 and instead the device 2 becomes a size sorter, where the mixed waste may be fed 28 onto the screen bed 9 at or adjacent to the bottom edge 32. In this configuration, shown in FIG. 4 (at a zero-degree tilt angle 26), the first fraction of the mixed waste passing over the top edge 30 and the distal edge 10 may be combined or kept separate, while the second fraction 40 passes through the screen as the undersized fraction. While the spacing between discs on adjacent rotatable shafts 7 i.e., the intra-disc space is shown in FIG. 4 as constant along the screen bed 9, it may be varied to further fractionalize the mixed waste passing through the screen. For example, the intra-disc spacing may be increased along the screen bed 9, such that the second fraction 40 that passes through the screen at the beginning of the screen bed 9 (i.e., closer to the bottom edge 32) is comprised of smaller pieces than the second fraction 40 that passes through the screen near the end of the screen bed 9 (i.e., closer to the top edge 30).

Due to the diagonal motion inherent to auger screens, these sizing screens are often limited to 8 to 15 rotatable shafts before the material needs to be regathered and fed to a secondary or tertiary sizing screen device. With the air flow counteracting the lateral motion toward the distal edge 10, the device 2 can be made longer with more rotatable shafts 7, allowing for greater screening efficiency without the need for additional conveyors or machines. As shown in FIG. 4, the typical travel for a device without counteracting airflow is shown by arrow 52, while arrow 54 shows travel with counteracting airflow. Discs for this class of screen may be constructed of elastomeric material and/or metal.

The discs 8 may have a non-round cross-sectional shape 55, such as an oval, elliptical, lobed, or other profile that is sufficiently non-round to effectuate the presently disclosed functionalities. This shape may increase material agitation, promote tumbling, and reduce the formation of steady flow paths. The discs may also comprise, at least in part, an elastomeric material 60, such as rubber, to increase friction with the waste material. This friction may assist in moving flexible or planar items and reduce the likelihood of wrapping. In some embodiments, the rotatable shafts 7 themselves may also have a non-circular cross-section to further disrupt uniform flow and enhance separation effects.

The system may also be implemented with screw conveyors or helical flights in place of, or in combination with, discs in the auger disc screen. In such embodiments, material may be conveyed in both the radial and axial directions simultaneously, further enhancing diagonal flow. Screw conveyors may be cantilevered and may include elastomeric flights or non-round geometries to promote agitation and self-cleaning. The rotational axes of the screws may be tilted to introduce gravity-assisted reverse motion, extending exposure to airflow or sorting thresholds.

Air stream generators used with screw configurations may be positioned at the distal ends of the screw conveyors, mounted above or beside the screen surface. In one configuration, a series of independently adjustable fans may be used. In another, airflow may be introduced via a manifold or plenum system forming a directed air curtain. The air stream may be zoned, enabling upstream pre-conditioning and downstream ejection. These features enable airflow to oppose, redirect, or deflect axial flow patterns, thereby shaping material trajectories with precision.

The four fractions may be optimized to address downstream processing needs. For example, the first fraction may consist primarily of light flexible items like plastic bags or paper. The second may be organics or fines. The third may include bouncing containers or small rigid items. The fourth may capture heavy, wrapping, or maintenance-risk items, such as textiles, metal tools, or lawn mower blades. Concentrating such materials into a known side stream allows for preemptive removal and reduces the risk of damage to sensitive downstream equipment, including optical sorters or conveyor belts.

Sensor-based control systems may be implemented to dynamically adjust air speed, tilt angle, and shaft rotation based on real-time feedback. Sensors may include optical, mechanical, or pressure-based devices for detecting flow composition, blockage, or mechanical load. A programmable logic controller may process sensor input and adjust the system accordingly to optimize performance, minimize downtime, or react to changing waste stream characteristics.

The auger disc screen 5 and frame may be modular, allowing replacement or reconfiguration of screen sections. For instance, upstream segments may use more aggressive disc geometries for initial agitation, while downstream sections may be tuned for precision airflow separation. The system may be implemented as a stand-alone unit or within a multi-stage material recovery facility (MRF). Construction materials may include steel, aluminum, or composite structures depending on environmental and structural needs. Drive mechanisms may include direct motors, chain drives, or belt systems. Maintenance access, safety guarding, and cleaning features may be incorporated.

These and other variations, combinations, and sub-combinations may be implemented without departing from the scope of the claimed subject matter. One of ordinary skill in the art knows that the use cases, structures, schematics, flow diagrams, and steps may be performed in any order or sub-combination, while the inventive concept of the present invention remains without departing from the broader scope of the invention. Every embodiment may be unique, and step(s) of method(s) may be either shortened or lengthened, overlapped with other activities, postponed, delayed, and/or continued after a time gap, such that every active user and running application program is accommodated by the server(s) to practice the methods of the present invention.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter. In addition, those skilled in the art will understand and appreciate that the methods could alternatively be represented as a series of interrelated states via a state diagram or events or their equivalent.

As used herein, the singular forms "a," "an," and "the" include plural references unless the context clearly indicates otherwise. Thus, for example, reference to "a cable" includes a single cable as well as a bundle of two or more different cables, and the like.

The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes, parameters, etc., to provide a thorough understanding of the present invention. The features, structures, materials, or characteristics may be combined in any suitable manner in one or more embodiments. The words "example," "exemplary," "illustrative," and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "of" is intended to mean an inclusive "or" rather than an exclusive "or." That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number±10%, such that "about 10" would include from 9 to 11. In other exemplary embodiments, the term "about" may include the recited number±X %, where X is considered the normal variation in said measurement by one of ordinary skill in the art.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom. Accordingly, the structural and functional components described herein may be rearranged, combined, or separated to form alternative embodiments, including method-based, apparatus-based, and system-implemented configurations.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention, which is defined solely by the claims.

The invention claimed is:

1. A mixed solid waste sorting device comprising:

an auger disc screen including a plurality of rotatable shafts, each supporting a plurality of mounted discs, the plurality of discs collectively defining a screen bed with a top edge, a bottom edge, a proximal edge, and a distal edge;

a motor configured to rotate the plurality of rotatable shafts at an adjustable rotation speed, wherein such rotation imparts:

a first lateral force on the mixed solid waste toward the distal edge; and a second lateral force on the mixed solid waste toward the top edge; and an air stream generator positioned adjacent to the distal edge of the screen bed, configured to generate an air stream across the screen bed from the distal edge toward the proximal edge;

wherein the air stream is of sufficient strength to counteract at least a portion of the first lateral force acting on a first fraction of the mixed solid waste, thereby increasing the dwell time of said first fraction on the screen bed and enabling the second lateral force to propel the first fraction over the top edge.

2. The device of claim 1, wherein the screen bed forms a tilt angle with respect to a plane horizontal to the ground, the tilt angle being less than 20 degrees.

3. The device of claim 2, wherein the mixed solid waste stream is fed onto the screen bed at or adjacent to the bottom edge.

4. The device of claim 3, wherein the mixed solid waste is further sorted into a second fraction that falls through the spaces between discs mounted on adjacent shafts.

5. The device of claim 1, wherein the screen bed forms a tilt angle with respect to a plane horizontal to the ground, further comprising a tilt mechanism configured to adjust the tilt angle.

6. The device of claim 5, wherein the tilt mechanism comprises a hydraulic actuator or a linear actuator.

7. The device of claim 1, wherein the air stream generator comprises one or more fans.

8. The device of claim 1, wherein the air stream generator comprises a manifold or plenum system.

9. The device of claim 1, wherein the direction of the air stream generator is adjustable.

10. The device of claim 1, wherein the air stream generator has an adjustable speed, and wherein a higher speed increases the quantity of material in the first fraction that is propelled over the top edge of the screen bed.

11. The device of claim 1, wherein the mixed solid waste stream is fed onto the screen bed, and wherein the mixed solid waste is sorted into:

a second fraction that passes through the spaces between discs on adjacent shafts;

a third fraction that exits the screen bed along the bottom edge; and a fourth fraction that exits the screen bed along the distal edge.

12. The device of claim 11, wherein the screen bed forms a tilt angle with a plane horizontal to the ground, the device further comprising:

a tilt mechanism configured to change the tilt angle; and wherein a steeper tilt angle increases the amount of material in the third fraction that exits from the screen bed along the bottom edge.

13. The device of claim 11, wherein a lower rotation speed of the rotatable shafts increases the amount of material in the fourth fraction exiting the distal edge.

14. The device of claim 1, wherein each in the plurality of discs comprises an elastomeric material.

15. The device of claim 1, wherein each in the plurality of discs has a non-round cross-sectional profile.

16. The device of claim 1, where discs on adjacent shafts are separated by an intra-disc space that is constant along the length of the screen bed.

17. The device of claim 1, where discs on adjacent shafts are separated by an intra-disc space that varies along the length of the screen bed.

* * * * *